US012771209B2

(12) United States Patent
Mori

(10) Patent No.: US 12,771,209 B2
(45) Date of Patent: Oct. 20, 2026

(54) DRIVE DEVICE

(71) Applicant: TOYOTA JIDOSHA KABUSHIKI KAISHA, Toyota (JP)

(72) Inventor: Nobuhito Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 18/741,477

(22) Filed: Jun. 12, 2024

(65) Prior Publication Data

US 2024/0429785 A1    Dec. 26, 2024

(30) Foreign Application Priority Data

Jun. 20, 2023 (JP) ................................. 2023-100732

(51) Int. Cl.
*H02K 9/193* (2006.01)
*B60K 11/02* (2006.01)
*H02K 7/116* (2006.01)
*H02K 11/33* (2016.01)

(52) U.S. Cl.
CPC ............ *H02K 9/193* (2013.01); *H02K 7/116* (2013.01); *H02K 11/33* (2016.01); *B60K 11/02* (2013.01)

(58) Field of Classification Search
CPC ........ H02K 9/193; H02K 11/33; H02K 7/116; H02K 11/02; H02K 9/00; H02K 9/19; H02K 9/12
USPC ........................................ 310/52, 54, 58, 59
See application file for complete search history.

(56) References Cited

U.S. PATENT DOCUMENTS

| | | | | |
|---|---|---|---|---|
| 2020/0276899 | A1 | 9/2020 | Gramann et al. | |
| 2023/0065709 | A1 * | 3/2023 | Watanabe .............. | H02K 11/33 |
| 2024/0348128 | A1 | 10/2024 | Krank et al. | |

FOREIGN PATENT DOCUMENTS

| | | | | |
|---|---|---|---|---|
| DE | 10 2021 125 659 | A1 | 4/2023 | |
| JP | 2001-298964 | A | 10/2001 | |
| JP | 2014-213693 | A | 11/2014 | |
| JP | 2019-502347 | A | 1/2019 | |
| JP | 2023-030828 | A | 3/2023 | |
| JP | 2023-035537 | A | 3/2023 | |
| WO | WO 2021/166299 | A1 | 8/2021 | |
| WO | WO-2023006221 | A1 * | 2/2023 | ............ H02K 9/197 |

* cited by examiner

*Primary Examiner* — Jose A Gonzalez Quinones
(74) *Attorney, Agent, or Firm* — Finnegan, Henderson, Farabow, Garrett, and Dunner, LLP

(57) ABSTRACT

A device includes: a motor; a gear unit; a power conversion unit; a casing that includes a first chamber and a second chamber separated from each other by a partition wall; and a cooling system that circulates a thermal transfer medium to at least one of the first chamber and the second chamber, wherein the cooling system includes a partition wall cooling route that supplies the thermal transfer medium to the partition wall, and is configured such that a supply amount of the thermal transfer medium to the partition wall cooling route is greater in a state in which vehicle speed of the vehicle is low and output torque of the motor is high, as compared to a state in which the vehicle speed is high and the output torque is low.

16 Claims, 6 Drawing Sheets

| | COOLING OF MOTOR 40 | COOLING OF PARTITION WALL 13 | LUBRICATION AND COOLING OF GEAR UNIT 50 |
|---|---|---|---|
| LOW-SPEED-LOW-TORQUE REGION R1 | | | |
| LOW-SPEED-HIGH-TORQUE REGION R2 | PRIORITY | PRIORITY | |
| HIGH-SPEED-LOW-TORQUE REGION R3 | | | PRIORITY |
| HIGH-SPEED-HIGH-TORQUE REGION R4 | PRIORITY | | PRIORITY |

A4 A5 A1 A2 A3 A6 A7

DRIVE DEVICE

CROSS-REFERENCE TO RELATED APPLICATION

This application claims priority to Japanese Patent Application No. 2023-100732 filed on Jun. 20, 2023, incorporated herein by reference in its entirety.

BACKGROUND

1. Technical Field

Technology disclosed in the present specification relates to a drive device for a vehicle.

2. Description of Related Art

A drive device for a vehicle that is disclosed in Japanese Unexamined Patent Application Publication No. 2023-35537 (JP 2023-35537 A) includes a configuration in which a case that accommodates a power conversion unit and a case that accommodates a motor are integrally connected. In this drive device, a partition wall separating the power conversion unit and the motor is provided with fins for air cooling.

SUMMARY

In the drive device of JP 2023-35537 A, optimization of cooling has not been studied. Accordingly, there are cases in which an amount of heat transferred from the motor to the power conversion unit increases during low-speed driving in which cooling is difficult due to not being able to depend on wind from traveling, and during high-torque driving in which the motor generates a large amount of heat. As a result, lifespans of various types of electronic components of the power conversion unit may become shorter due to the increase in heat load.

A drive device for a vehicle disclosed in the present specification includes a motor; a gear unit that is mechanically connected to the motor; a power conversion unit that is electrically connected to the motor; a casing that includes a first chamber and a second chamber separated from each other by a partition wall, at least one of the motor and the gear unit being housed in the first chamber, and the power conversion unit being housed in the second chamber; and a cooling system that circulates a thermal transfer medium to at least one of the first chamber and the second chamber, wherein the cooling system includes a partition wall cooling route that supplies the thermal transfer medium to the partition wall, and is configured such that a supply amount of the thermal transfer medium to the partition wall cooling route is greater in a state in which vehicle speed of the vehicle is low and output torque of the motor is high, as compared to a state in which the vehicle speed is high and the output torque is low.

The thermal transfer medium can be in various forms. For example, the thermal transfer medium may be oil, water, air, or the like. According to the above configuration, the supply amount of thermal transfer medium supplied to the partition wall cooling route can be adjusted as appropriate, in accordance with the vehicle speed and the output torque. Even under conditions in which cooling the partition wall is difficult (e.g., low vehicle speed conditions or high torque conditions), the partition wall can be cooled. The amount of heat transferred from the motor to the power conversion unit can be suppressed, and accordingly increase in thermal load on the power conversion unit can be suppressed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
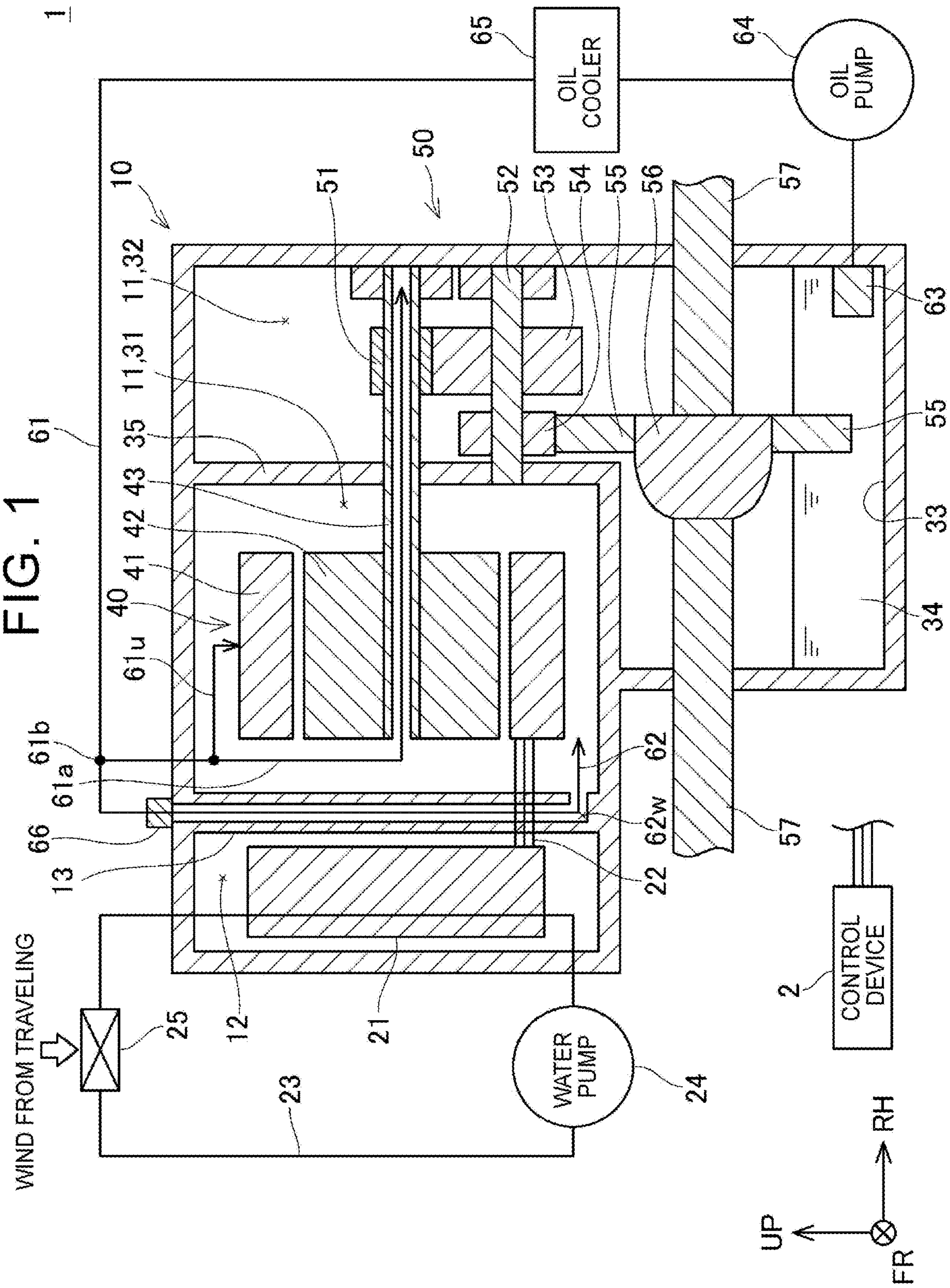
FIG. 1 is a diagram illustrating a schematic configuration of a drive device 1.

When a vehicle speed index correlated with the vehicle speed is lower than a first threshold value, the greater a torque index correlated with the output torque is, the more the cooling system may increase the supply amount of the thermal transfer medium to the partition wall cooling route, stepwise or continuously.

According to the above configuration, when the vehicle speed is low, the greater heat generation of the motor is, the more the cooling performance of the partition wall can be increased.

The cooling system may adjust the supply amount of the thermal transfer medium to the partition wall cooling route to a first supply amount when the vehicle speed index is lower than the first threshold value and also the torque index is lower than a second threshold value. The cooling system may adjust the supply amount of the thermal transfer medium to the partition wall cooling route to a second supply amount that is greater than the first supply amount when the vehicle speed index is lower than the first threshold value and also the torque index is higher than the second threshold value.

According to the above configuration, when the vehicle speed is low, the performance of cooling the partition wall can be increased in accordance with increase of the output torque of the motor (i.e., in accordance with increase of the heat generation of the motor).

When a torque index correlated with the output torque is higher than a second threshold value, the greater a vehicle speed index correlated with the vehicle speed is, the more the cooling system may reduce the supply amount of the thermal transfer medium to the partition wall cooling route, stepwise or continuously.

According to the above configuration, when the output torque of the motor is great, the greater the vehicle speed is, the more the cooling performance of the partition wall can be reduced. Accordingly, the reduction in performance of cooling the partition wall can be allocated to other parts, such as the motor and so forth. The cooling performance of the drive device overall can be optimized.

The cooling system may adjust the supply amount of the thermal transfer medium to the partition wall cooling route to a second supply amount when the torque index is higher than the second threshold value and also the vehicle speed index is lower than a first threshold value. The cooling system may adjust the supply amount of the thermal transfer medium to the partition wall cooling route to a third supply amount that is smaller than the second supply amount when the torque index is higher than the second threshold value and also the vehicle speed index is higher than the first threshold value.

According to the above configuration, when the output torque is great, the greater the vehicle speed is, the more the cooling performance of the partition wall can be reduced. Accordingly, the reduction in performance of cooling the partition wall can be allocated to other parts, such as the motor and so forth.

At least the motor may be housed in the first chamber. The cooling system may further include a motor cooling route that supplies the thermal transfer medium to the motor. The cooling system may switch a ratio of the supply amount of the thermal transfer medium supplied to the partition wall cooling route as to a supply amount of the thermal transfer medium supplied to the motor cooling route between at least two levels, in accordance with a combination of a vehicle speed index correlated with the vehicle speed and a torque index correlated with the output torque.

According to the above configuration, appropriation of cooling performance between the partition wall and the motor can be controlled by the ratio of the supply amount of thermal transfer medium between the partition wall and the motor.

When the torque index is higher than a second threshold value, the greater the vehicle speed index is, the more the cooling system may reduce the ratio, stepwise or continuously.

According to the above configuration, when the output torque of the motor is great, the greater the vehicle speed is, more cooling performance can be appropriated to the motor than to the partition wall. Energy consumption of the motor can be suppressed, and accordingly efficiency can be improved.

The cooling system may adjust the ratio to a first ratio when the torque index is higher than the second threshold value and also the vehicle speed index is lower than a first threshold value. The cooling system may adjust the ratio to a second ratio that is smaller than the first ratio when the torque index is higher than the second threshold value and also the vehicle speed index is higher than the first threshold value.

According to the above configuration, when the output torque is great, the greater the vehicle speed is, more cooling performance can be appropriated to the motor than to the partition wall.

The thermal transfer medium may be a liquid. The cooling system may further include a pump that supplies the thermal transfer medium to the partition wall cooling route and the motor cooling route. The cooling system may further include a flow rate adjustment unit configured to adjust the ratio of the supply amount of the thermal transfer medium supplied to the partition wall cooling route as to the supply amount of the thermal transfer medium supplied to the motor cooling route.

According to the above configuration, the cooling performance can be appropriated between the motor and the partition wall by the pump and the flow rate adjustment unit.

The thermal transfer medium may be oil. The first chamber may further include a gear compartment that houses the gear unit. The oil may be stored in the first chamber.

The casing may further include a reservoir, for storing the oil, at a lower portion of the gear compartment. A portion of the gear unit may be immersed in the oil stored in the reservoir. The cooling system may further include a pump that delivers the oil stored in the reservoir to the partition wall cooling route. The cooling system may switch a delivery amount from the pump between at least two levels in accordance with a combination of a vehicle speed index correlated with the vehicle speed and a torque index correlated with the output torque.

According to the above configuration, appropriation of oil supply performance between the partition wall and the gear unit can be controlled by the delivery amount from the pump.

The greater the vehicle speed index is, the more the cooling system may reduce the delivery amount of the oil that is delivered to the partition wall cooling route, stepwise or continuously.

According to the above configuration, the greater the vehicle speed is, the more the amount of oil stored in the reservoir can be increased. Thus, the greater the vehicle speed is, more lubricating performance by oil can be appropriated to the gear unit. This enables seizure and so forth of the gear unit to be suppressed.

The first chamber may further include a motor compartment that houses the motor. The cooling system may further include a motor cooling route that supplies the oil to the motor. The pump may deliver the oil stored in the reservoir to the partition wall cooling route and the motor cooling route. The cooling system may switch a ratio of a supply amount of the oil supplied to the partition wall cooling route as to a supply amount of the oil supplied to the motor cooling route between at least two levels in accordance with a combination of the vehicle speed index and the torque index.

According to the above configuration, the appropriation of oil supply performance can be controlled among the partition wall, the gear unit, and the motor.

When the torque index is higher than a second threshold value, the greater the vehicle speed index is, the more the cooling system may reduce the ratio, stepwise or continuously.

According to the above configuration, when the output torque of the motor is great, the greater the vehicle speed is, more cooling performance can be appropriated to the motor than to the partition wall. Energy consumption of the motor can be suppressed, and accordingly efficiency can be improved.

EXAMPLES

Configuration of Drive Device 1

FIG. 1 illustrates a schematic configuration of a drive device 1 according to the present embodiment. The drive device 1 is an integrated device in which a motor, a gear unit, and a power conversion unit for controlling the motor, are housed in the same casing. FIG. 1 illustrates a state in which the drive device 1 is installed in a vehicle (battery electric vehicle). A direction FR indicates forward in a front-rear direction of the vehicle. Also, a direction RH indicates rightward in a right-left direction (or width direction) of the vehicle. Further, a direction UP indicates upward in an up-down direction of the vehicle. FIG. 1 is an illustration that is developed such that a plurality of shafts (motor shaft 43, countershaft 52, driveshaft 57) are situated in the same plane. Also, cooling routes are indicated by solid lines.

The drive device 1 is controlled by a control device 2. The control device 2 includes, for example, a central processing unit (CPU), random-access memory (RAM), read-only memory (ROM), an input/output interface, and so forth. The control device 2 is connected to a power conversion unit 21, an oil pump 64, a variable orifice 66, and so forth, by signal lines that are omitted from illustration.

The drive device 1 includes a casing 10. The casing 10 has a first chamber 11 and a second chamber 12 that are separated from each other by a partition wall 13.

The first chamber 11 includes a motor compartment 31 and a gear compartment 32. The compartments are both separated from each other by a dividing wall 35. A motor 40 is housed in the motor compartment 31. The motor 40 includes a stator 41, a rotor 42, and the motor shaft 43. The stator 41 has a cylindrical shape. The rotor 42 is rotatably disposed inside the stator 41. The motor shaft 43 is disposed coaxially with the rotation center of the rotor 42. The motor shaft 43 is hollow.

A gear unit 50 is housed in the gear compartment 32. The gear unit 50 includes a shaft gear 51, the countershaft 52, a first counter gear 53, a second counter gear 54, a ring gear 55, and a differential gear 56. The shaft gear 51 is attached to the motor shaft 43. Thus, the gear unit 50 and the motor 40 are mechanically connected.

The first counter gear 53 and the second counter gear 54 are attached to the countershaft 52. The first counter gear 53 meshes with the shaft gear 51. The second counter gear 54 meshes with the ring gear 55. The ring gear 55 is attached to the differential gear 56. The differential gear 56 drives the driveshaft 57. When rotation of the motor 40 is transmitted to the driveshaft 57, a pair of wheels (omitted from illustration) that is connected to the driveshaft 57 rotates. Thus, the vehicle travels.

A reservoir 33 is provided at a lower portion of the gear compartment 32. Oil 34 is stored in the reservoir 33. The oil 34 functions as a thermal transfer medium that cools the motor 40, the partition wall 13, and the gear unit 50, and also functions as a lubricant for the gear unit 50. That is to say, the oil 34 has cooling functions and lubricating functions. A portion of the gear unit 50 is immersed in the oil 34 stored in the reservoir 33. In the example of FIG. 1, a lower part of the differential gear 56 is immersed in the oil 34. The oil 34 that is stored is scooped up by the differential gear 56, thereby lubricating each gear of the gear unit 50.

The drive device 1 also includes a cooling system 60. The cooling system 60 is a system that circulates the oil 34 stored in the first chamber 11. The cooling system 60 includes a motor cooling route 61, a partition wall cooling route 62, a strainer 63, the oil pump 64, an oil cooler 65, and the variable orifice 66.

The motor cooling route 61 is a route over which the oil is supplied to the motor 40. The motor cooling route 61 is a route from the strainer 63 to the motor 40 via the oil pump 64 and the oil cooler 65. The strainer 63 is disposed within the reservoir 33. The oil pump 64 performs intake of the oil 34 in the reservoir 33 through the strainer 63. The oil pump 64 then delivers the oil that is intaken to the motor cooling route 61 and the partition wall cooling route 62. The delivery amount from the oil pump 64 is controlled by the control device 2. Details of controlling the delivery amount from the oil pump 64 will be described later. The oil cooler 65 is a heat exchanger that cools oil by heat exchange with a refrigerant. The oil delivered from the oil cooler 65 is introduced into an upper portion of the motor compartment 31.

The motor cooling route 61 branches into an upper route 61*u* and a shaft center route 61*a* within the motor compartment 31. The upper route 61*u* is provided with a plurality of discharge holes opening downward in a radial direction. The stator 41 is cooled by the oil discharged downward from the discharge holes. The motor shaft 43 has a hollow shape (cylindrical shape), and the shaft center route 61*a* is provided on an axial line thereof. The shaft center route 61*a* is provided with a plurality of discharge holes that pass through in the radial direction. The oil flowing out from the discharge holes flows down to a bottom portion of the motor compartment 31, via holes in the rotor 42 that are omitted from illustration.

The partition wall cooling route 62 is a route over which oil is supplied to the partition wall 13. The partition wall cooling route 62 is a route leading from the branch 61*b* of the motor cooling route 61 to the motor compartment 31, via the variable orifice 66 and an in-wall flow route 62*w*. The variable orifice 66 is a flow rate adjustment unit for controlling the flow rate of oil branching and flowing into the partition wall cooling route 62. In other words, the variable orifice 66 controls a ratio of the supply amount of oil supplied to the partition wall cooling route 62, as to the supply amount of oil supplied to the motor cooling route 61. Details of control of the variable orifice 66 will be described later. The in-wall flow route 62*w* is a flow route that is disposed within the partition wall 13.

The oil supplied to the motor 40 over the motor cooling route 61 and to the oil supplied to the partition wall 13 over the partition wall cooling route 62 flows downward into the motor compartment 31. The oil that has flowed down returns to the reservoir 33 in the gear compartment 32 via communication holes (omitted from illustration) or the like that are provided in the dividing wall 35.

The power conversion unit 21 is housed in the second chamber 12. The power conversion unit 21 is a part for controlling electric power supplied to the motor 40 and electric power that is generated. Examples of components included in the power conversion unit 21 include an inverter, a converter, and so forth. The power conversion unit 21 is electrically connected to the motor 40 by a bus bar 22. The power conversion unit 21 is also provided with a coolant channel 23. The coolant channel 23 includes a water pump 24 and a radiator 25. Coolant circulates through the coolant channel 23.

Oil Supply Control

The cooling system 60 controls the oil pump 64 and the variable orifice 66 in accordance with a combination of vehicle speed index and torque index. The vehicle speed index is an index that is correlated with vehicle speed of the vehicle. In the present embodiment, the vehicle speed index is revolutions of the motor 40. The torque index is an index that is correlated with output torque of the motor 40. In the present embodiment, the torque index is a torque command value for the motor 40.

Figures 2, 3:
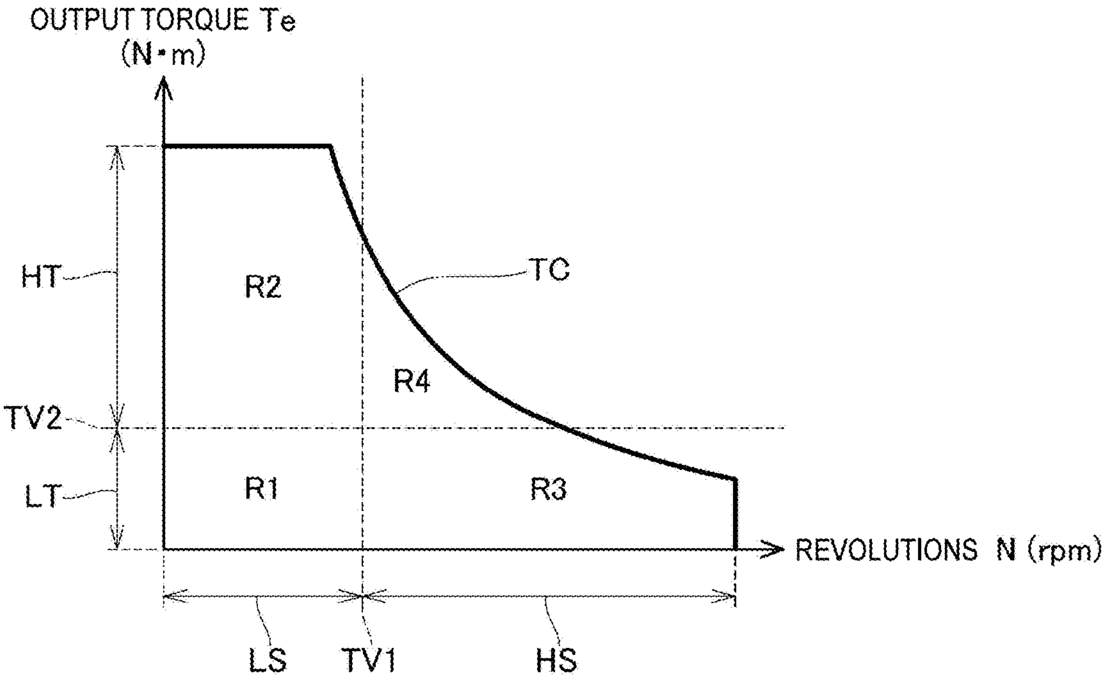
FIG. 2 is an example of a torque curve TC of a motor 40.
FIG. 3 is a table showing appropriation of oil supply amount.

This will be described in detail with reference to FIG. 2. FIG. 2 shows a torque curve TC of the motor 40. The horizontal axis in FIG. 2 is revolutions N of the motor 40, and the vertical axis is output torque Te. A first threshold value TV1 that is set in advance is provided for the revolutions N. A second threshold value TV2 that is set in advance is provided for the output torque Te. Note that the first threshold value TV1 and the second threshold value TV2 may be determined in various ways. These threshold values may be fixed values, for example, or may be calculated each time based on a calculation formula or a table.

Regarding the revolutions N, a range lower than the first threshold value TV1 is defined as a low speed range LS, and a range higher than the first threshold value TV1 is defined as a high speed range HS. In the low speed range LS, the cooling performance of the power conversion unit 21 is lower than that in the high speed range HS. This is because the slower the vehicle speed is, the smaller an amount of wind from traveling that passes through the radiator 25 is, and accordingly the amount of heat that is dissipated by the radiator 25 is lower. Here, the term "wind from traveling" refers to a flow of air that flows into the engine compartment when the vehicle is traveling. As the vehicle speed increases, the amount of wind from traveling also increases. This is also because there are cases in which the slower the vehicle speed is, the less readily ambient temperature around the drive device 1 is made to drop. Furthermore, in the high speed range HS, seizure of the gear unit 50 is more likely to occur than in the low speed range LS. This is because the faster the gear unit 50 rotates, the more likely oil film rupture is to occur.

In the output torque Te, a range lower than the second threshold value TV2 is defined as a low torque range LT, and a range higher than the second threshold value TV2 is defined as a high torque range HT. Examples of a situation in which the vehicle is in the low torque range LT include when traveling downhill or on flat ground. Examples of a situation in which the vehicle is in the high torque range HT include when traveling uphill. In the high torque range HT, an amount of heat generated by the motor 40 is greater than that in the low torque range LT. This is because electric current flowing through the motor 40 increases as the output torque Te increases.

Thus, regions of the torque curve TC are classified into four regions, which are low-speed-low-torque region R1, low-speed-high-torque region R2, high-speed-low-torque region R3, and high-speed-high-torque region R4. The low-speed-low-torque region R1 is defined by the low speed range LS and the low torque range LT. The low-speed-high-torque region R2 is defined by the low speed range LS and the high torque range HT. The high-speed-low-torque region R3 is defined by the high speed range HS and the low torque range LT. The high-speed-high-torque region R4 is defined by the high speed range HS and the high torque range HT. The low-speed-low-torque region R1 and the high-speed-low-torque region R3 are regions in which a throttle valve opening degree is relatively small. The low-speed-high-torque region R2 and the high-speed-high-torque region R4 are regions in which the throttle valve opening degree is relatively great.

The table in FIG. 3 shows appropriation of oil supply amounts among the three of the partition wall 13, the motor 40, and the gear unit 50. Here, "priority" means that the oil supply amount is increased. The cooling system 60 changes the parts to which oil is supplied with priority in each of the low-speed-low-torque region R1 to the high-speed-high-torque region R4. This will be described in detail.

In the low-speed-low-torque region R1, the amount of heat generated by the motor 40 is small, and the gear unit 50 is less likely to run out of oil. Accordingly, there is no need to preferentially supply oil to any one of the motor 40, the gear unit 50, and the partition wall 13.

In the low-speed-high-torque region R2, oil supply to the motor 40 and the partition wall 13 is given priority over oil supply to the gear unit 50. The reason why priority is given to cooling the motor 40 is that the amount of heat generated by the motor 40 increases in the high torque range HT. Also, the reason why priority is given to cooling of the partition wall 13 is that the cooling performance of the power conversion unit 21 becomes low in the low speed range LS. When the performance of cooling the power conversion unit 21 decreases, it becomes difficult to remove the amount of heat transferred from the motor 40 via the partition wall 13. Accordingly, a heat load applied to the power conversion unit 21 due to the heat generated by the motor 40 increases. Thus, increasing the performance of cooling the partition wall 13 enables heat transfer from the motor 40 to be suppressed. That is to say, the decrease in the performance of cooling the power conversion unit 21 due to decrease in vehicle speed can be compensated for by the performance of cooling the partition wall 13.

In the high-speed-low-torque region R3, oil supply to the gear unit 50 is given priority over oil supply to the motor 40 and the partition wall 13. The reason thereof is that in the high speed range HS, seizure of the gear unit 50 is more likely to occur. This is also because the amount of heat generated by the motor 40 is small in the low torque range LT.

In the high-speed-high-torque region R4, oil supply to the motor 40 and the gear unit 50 is given priority over oil supply to the partition wall 13. The reason why priority is given to cooling the motor 40 is that the amount of heat generated by the motor 40 increases in the high torque range HT. The reason why priority is given to lubrication of the gear unit 50 is that seizure of the gear unit 50 is more likely to occur in the high speed range HS. Also, the reason why it is not necessary to give priority to cooling the partition wall 13 is that in the high speed range HS, the amount of wind from traveling increases, so the performance of cooling the power conversion unit 21 increases.

Operations and Advantages of Cooling System 60

Specific operations of the cooling system 60 for performing oil supply control shown in FIG. 3 will be described. In the low-speed-low-torque region R1, the cooling system 60 adjusts the oil supply amount of oil supplied to the partition wall cooling route 62 to a first supply amount (see region A1 in FIG. 3). Also, in the low-speed-high-torque region R2, the cooling system 60 adjusts the supply amount of oil supplied to the partition wall cooling route 62 to a second supply amount that is greater than the first supply amount (see region A2). Control to increase the oil supply amount can be performed by at least one of increasing an oil distribution ratio to the partition wall cooling route 62 using the variable orifice 66, and increasing the delivery amount from the oil pump 64.

In other words, in the low speed range LS, the greater the output torque Te is, the more the cooling system 60 performs stepwise increase of the supply amount of oil supplied to the partition wall cooling route 62 (see regions A1 and A2). Thus, when the vehicle speed is low, the performance of cooling the partition wall 13 can be increased in accordance with increase in the output torque of the motor 40 (i.e., in accordance with increase in the heat generation of the motor 40). This enables a thermal load applied to the power conversion unit 21 due to the heat generated by the motor 40 to be suppressed.

In the low-speed-high-torque region R2, the cooling system 60 adjusts the oil supply amount of oil supplied to the partition wall cooling route 62 to the second supply amount (see region A2 in FIG. 3). Also, in the high-speed-high-torque region R4, the cooling system 60 adjusts the oil supply amount of oil supplied to the partition wall cooling route 62 to a third supply amount that is smaller than the second supply amount (see region A3).

In other words, in the high torque range HT, the greater the vehicle speed is, the more the cooling system 60 performs stepwise reduction of the oil supply amount of oil supplied to the partition wall cooling route 62 (see regions A2 and A3). Thus, when the output torque is great, the cooling performance of the partition wall 13 can be reduced in accordance with the vehicle speed increasing. Accordingly, the amount of reduction in performance of cooling the partition wall 13 can be allocated to other parts, such as the motor 40 and so forth. The cooling performance of the drive device 1 overall can be optimized.

In the low-speed-high-torque region R2, the cooling system 60 adjusts the ratio of the oil supply amount of oil supplied to the partition wall cooling route 62 as to the oil supply amount of oil supplied to the motor cooling route 61 to a first ratio (see regions A2 and A4 in FIG. 3). Also, in the high-speed-high-torque region R4, the cooling system 60 adjusts the above ratio to a second ratio that is smaller than the first ratio (see regions A3 and A5). Control to reduce the above ratio can be performed by reducing the oil distribution ratio to the partition wall cooling route 62 with respect to the motor cooling route 61, using the variable orifice 66.

In other words, in the high torque range HT, the greater the vehicle speed is, the more the cooling system 60 performs stepwise reduction of the oil supply ratio of oil supplied to the partition wall cooling route 62. Thus, when the output torque of the motor 40 is great, the greater the vehicle speed is, more cooling performance can be distributed to the motor 40 than to the partition wall 13. Energy consumption of the motor 40 can be suppressed, and accordingly efficiency can be improved.

The cooling system 60 gives priority to oil lubrication of the gear unit 50 in the high-speed-high-torque region R4 (see region A7) over oil lubrication of the gear unit 50 in the low-speed-high-torque region R2 (see region A6). Control to increase the oil lubrication of the gear unit 50 can be performed by increasing the oil level in the reservoir 33 by reducing the delivery amount of oil from the oil pump 64.

In other words, the cooling system 60 performs stepwise reduction of the delivery amount of oil from the oil pump 64 as the vehicle speed increases. Thus, more lubricating performance by oil can be appropriated to the gear unit 50, the greater the vehicle speed is. This enables seizure and so forth of the gear unit 50 to be suppressed.

While an embodiment is described in detail above, the embodiment is merely exemplary, and is not intended to limit the scope of the claims. The technology described in the claims encompasses various modifications and alternations of the specific examples exemplified above. The technical elements described in the present specification or the drawings exhibit technical utility alone or in various combinations, and are not limited to the combinations described in the claims at the time of filing. The technology exemplified in the present specification or the drawings achieves a plurality of objects at the same time, and has technical utility by achieving one of the objects.

First Modification

Figure 4:
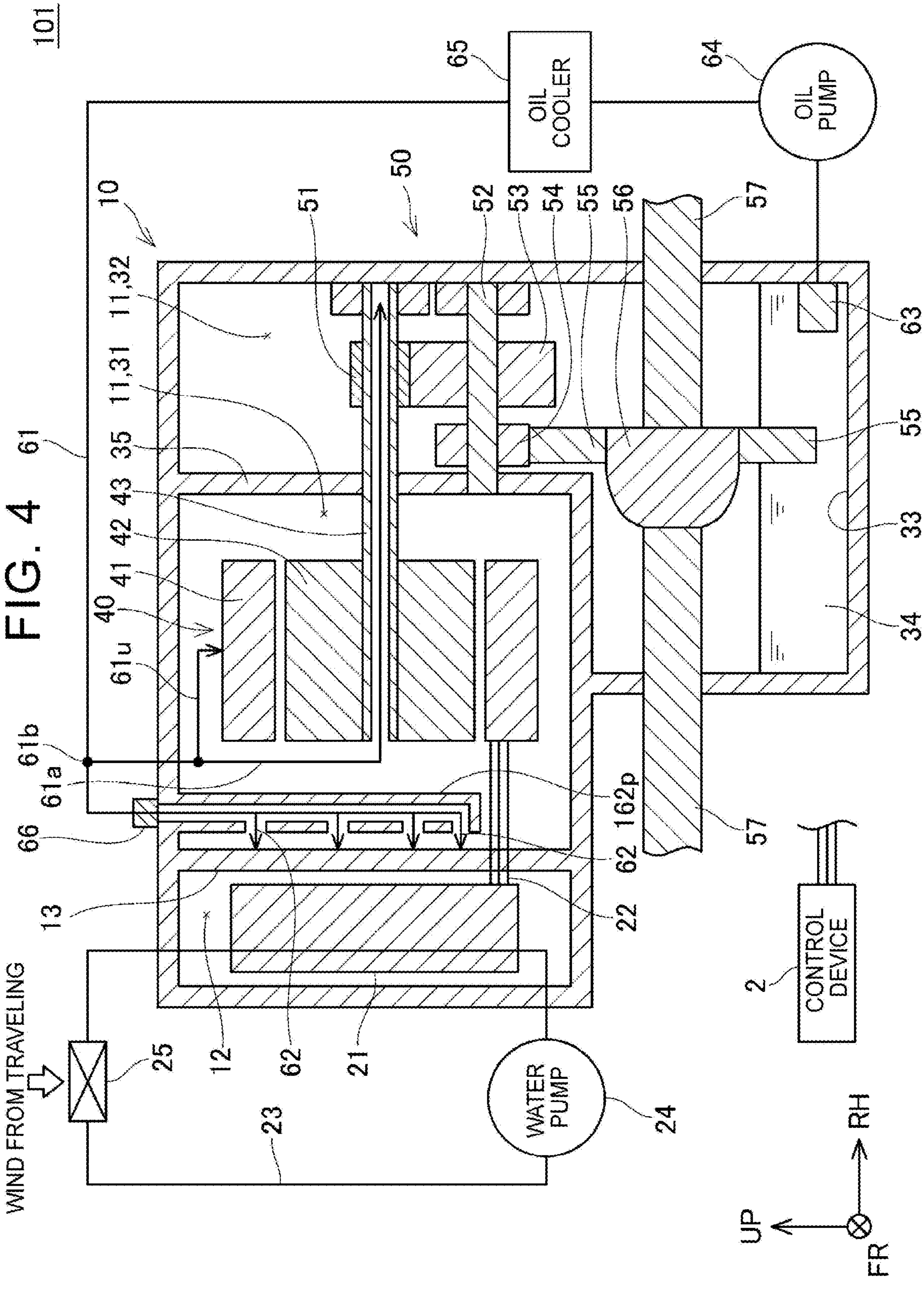
FIG. 4 is a diagram illustrating a schematic configuration of a drive device 101.

FIG. 4 illustrates a drive device 101 according to a first modification. Note that parts that are in common between the drive device according to the modifications and the drive device 1 according to the present embodiment (FIG. 1) are denoted by the same signs below, and accordingly description thereof will be omitted. The drive device 101 includes cooling piping 162*p* instead of the in-wall flow route 62*w* of the drive device 1. The cooling piping 162*p* is disposed within the motor compartment 31 so as to face the partition wall 13. The cooling piping 162*p* is provided with a plurality of discharge holes that open toward the partition wall 13. Oil is jetted toward the partition wall 13 from each of the discharge holes. The partition wall 13 can be cooled.

Second Modification

Figure 5:
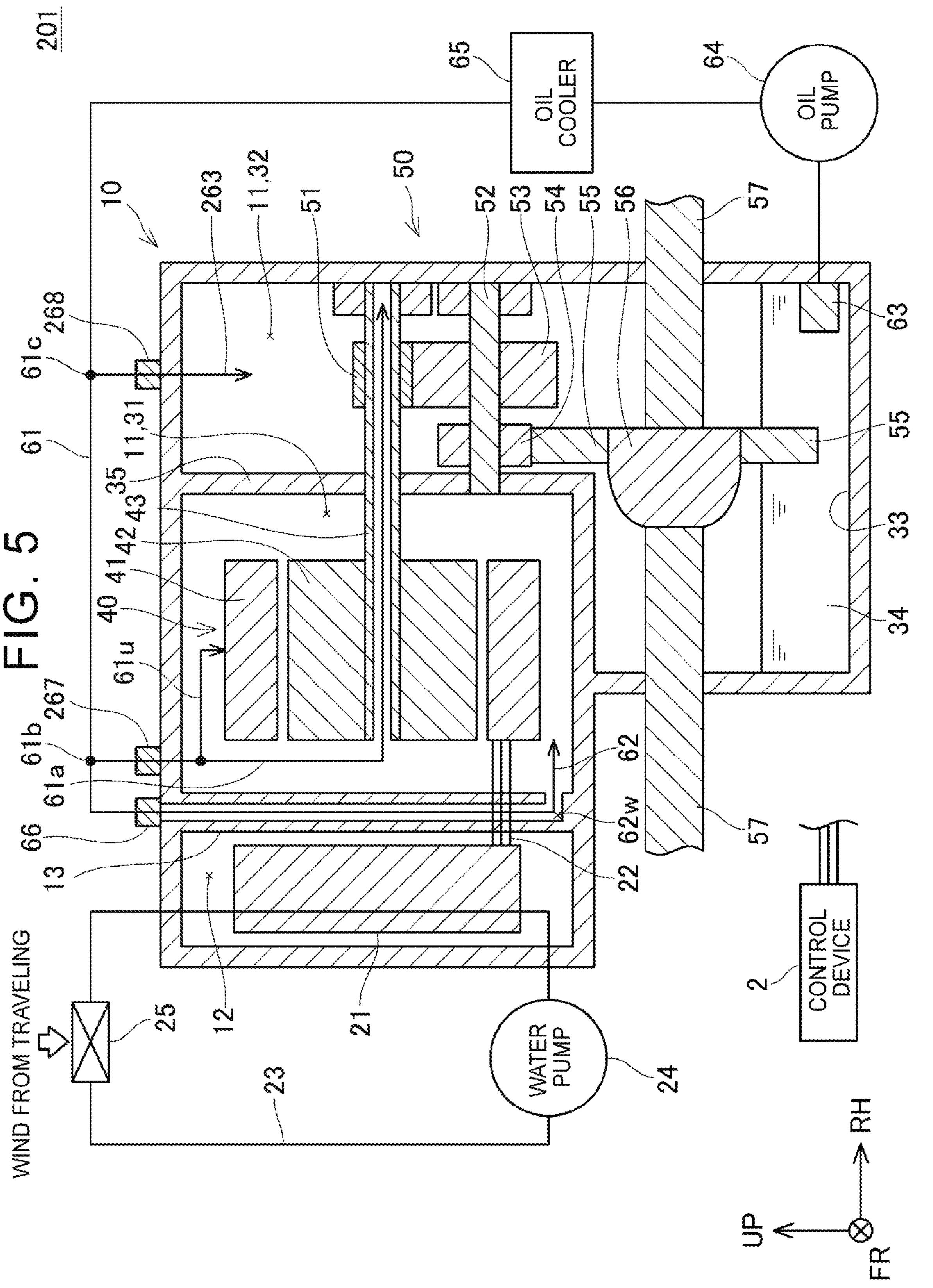
FIG. 5 is a diagram illustrating a schematic configuration of a drive device 201.

FIG. 5 illustrates a drive device 201 according to a second modification. The drive device 201 further includes a gear cooling route 263. The gear cooling route 263 is a route over which oil is supplied to the gear unit 50. The gear cooling route 263 is a route from a branch 61*c* of the motor cooling route 61 to the gear compartment 32 via a variable orifice 268. Further, a variable orifice 267 is disposed on the motor cooling route 61. The cooling system 60 controls the variable orifices 66, 267, and 268. Accordingly, the oil flow rate can be individually controlled in each of the partition wall cooling route 62, the shaft center route 61*a* and the upper route 61*u* of the motor 40, and the gear cooling route 263. Note that in the drive device 201, the gear cooling route 263 can also be omitted.

Third Modification

Figure 6:
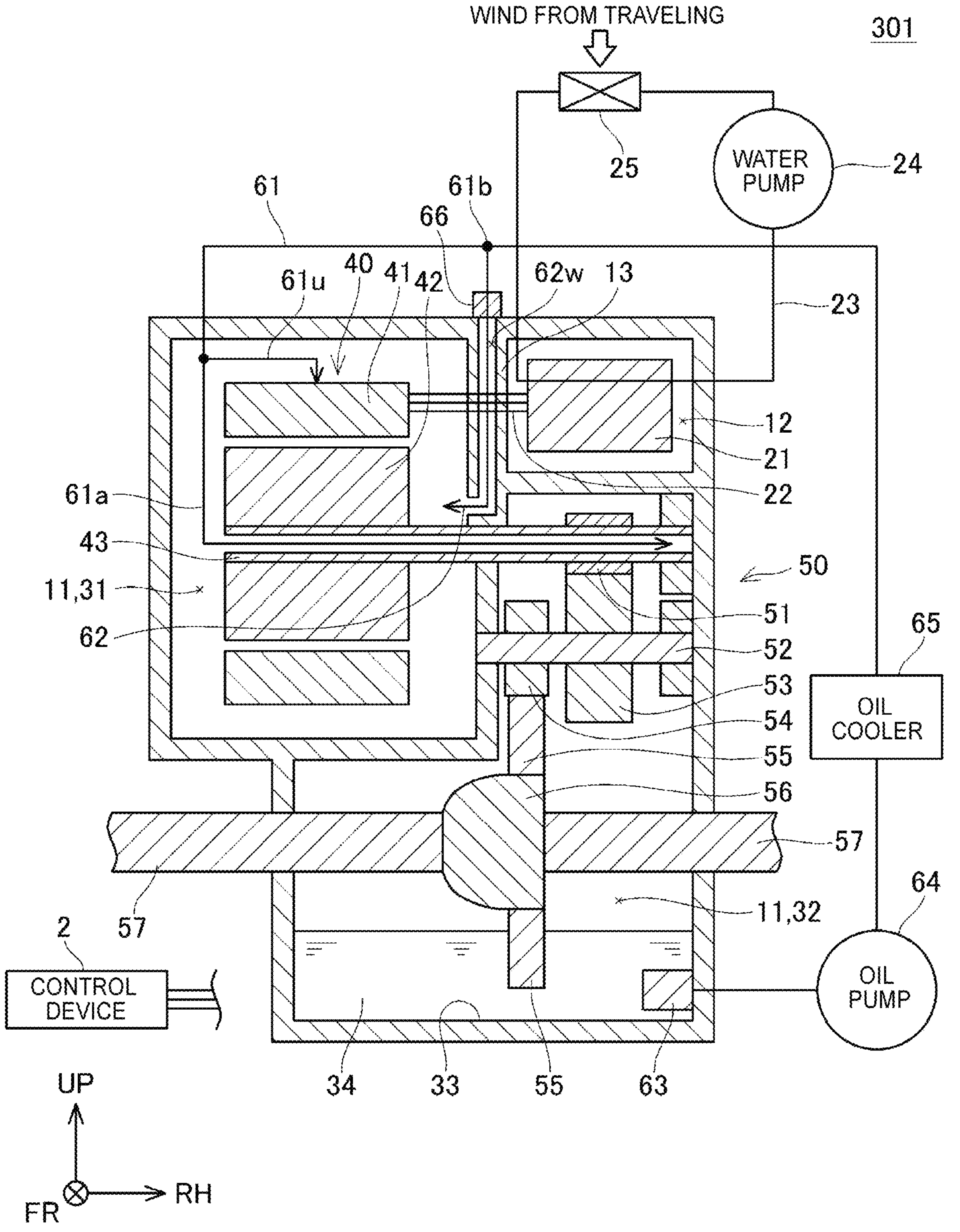
FIG. 6 is a diagram illustrating a schematic configuration of a drive device 301.

The position at which the second chamber 12 is disposed may vary. For example, the second chamber 12 may be disposed adjacent to the gear compartment 32, as illustrated in the drive device 301 according to a third modification illustrated in FIG. 6. Thus, unnecessary space in the gear compartment 32 can be diverted to use for the second chamber 12, thereby enabling further reduction in the build of the drive device 301.

Fourth Modification

Figure 7:
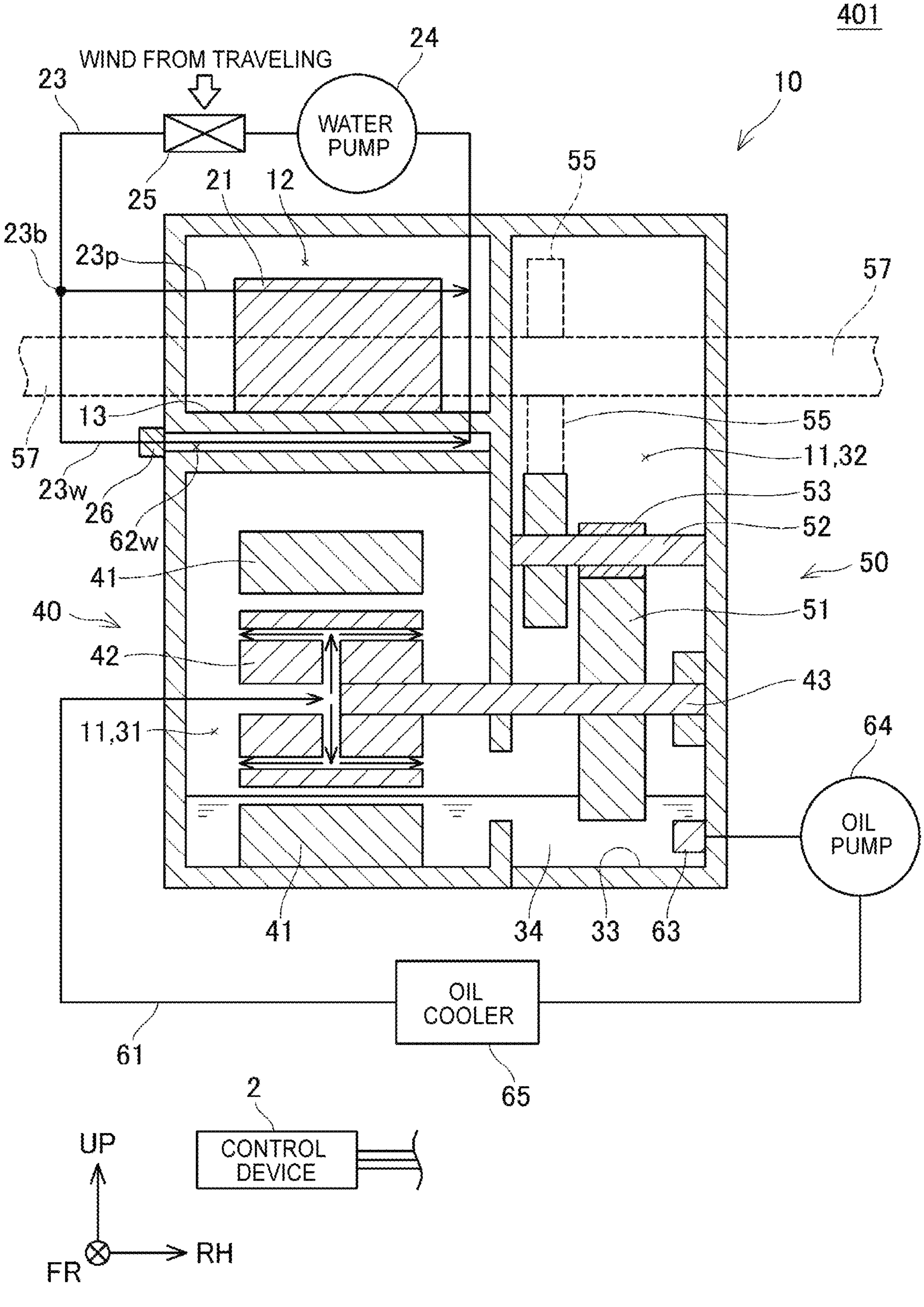
FIG. 7 is a diagram illustrating a schematic configuration of a drive device 401.

The thermal transfer medium that cools the partition wall 13 is not limited to oil. For example, as indicated in a drive device 401 according to a fourth modification illustrated in FIG. 7, a form may be made in which the partition wall 13 is cooled by a coolant. In the drive device 401, the second chamber 12 is disposed upward from and adjacent to the motor compartment 31. Also, the ring gear 55 and the driveshaft 57 are illustrated by dotted lines, due to being located on the front side in the vehicle (i.e., on the rear side of the plane of the drawing).

The coolant channel 23 branches into a power conversion unit cooling route 23*p* and a partition wall cooling route 23*w* at a branch 23*b*. The partition wall cooling route 23*w* is a route that returns from the branch 23*b* to the water pump 24 via a variable orifice 26 and the in-wall flow route 62*w*. The variable orifice 26 is a flow rate adjustment unit for controlling the flow rate of coolant branching and flowing into the partition wall cooling route 23*w*. In other words, the variable orifice 26 controls the ratio of the supply amount of coolant supplied to the partition wall cooling route 23*w* as to the supply amount of coolant supplied to the power conversion unit cooling route 23*p*.

Also, in the drive device 401 according to the fourth modification, the supply amount of the thermal transfer medium can be controlled in the same manner as in the drive device 1 according to the present embodiment. That is to say, the supply amount of coolant supplied to the partition wall cooling route 23*w* can be adjusted as appropriate, in accordance with the vehicle speed and the output torque. Accordingly, even under conditions in which cooling the partition wall 13 is difficult (e.g., low vehicle speed conditions or high torque conditions), the partition wall 13 can be appropriately cooled.

Other Modifications

The vehicle in which the drive device of the present specification is installed is not limited to a battery electric vehicle. The drive device of the present specification can be installed in, for example, a hybrid electric vehicle or a plug-in hybrid electric vehicle. In this case, the drive device of the present specification may house a plurality of motors in the casing, or may house a planetary gear mechanism. Further, the drive device of the present specification is also applicable to a vehicle that uses an electric motor for at least part of traveling, such as a fuel cell electric vehicle or the like, for example.

The first threshold value TV1 that divides the vehicle speed range, and the second threshold value TV2 that divides the torque range, are not limited to one each, and a plurality thereof may be used. Further, the adjustment of the oil supply amount by the cooling system 60 is not limited to a stepwise changing form. For example, the oil supply amount may be continuously changed in accordance with change in vehicle speed or change in output torque.

Various vehicle speed indices may be used, and the actual vehicle speed may be used, for example. Various torque indices may be used, and for example, an electric current value of the motor 40 may be used, or a torque measurement value that is measured by a torque sensor may be used.

The wind from traveling that flows through the vehicle may pass not only through the radiator 25 but also over a surface of the casing 10 of the drive device. Further, ribs may be provided on the surface of the casing 10 to function as thermal dissipation fins. Thus, the thermal load applied from the motor 40 and gear unit 50 side to the power conversion unit 21 side can be reduced.

What is claimed is:

1. A drive device for a vehicle, the drive device comprising:

a motor;

a gear unit that is mechanically connected to the motor;

a power conversion unit that is electrically connected to the motor;

a casing that includes a first chamber and a second chamber separated from each other by a partition wall, at least one of the motor and the gear unit being housed in the first chamber, and the power conversion unit being housed in the second chamber; and a cooling system that circulates a thermal transfer medium to at least one of the first chamber and the second chamber, wherein the cooling system includes a partition wall cooling route that supplies the thermal transfer medium to the partition wall, and is configured such that a supply amount of the thermal transfer medium to the partition wall cooling route is greater in a state in which vehicle speed of the vehicle is low and output torque of the motor is high, as compared to a state in which the vehicle speed is high and the output torque is low, and the partition wall cooling route includes a part for jetting the thermal transfer medium to the partition wall.

2. The drive device according to claim 1, wherein, when a vehicle speed index correlated with the vehicle speed is lower than a first threshold value, the greater a torque index correlated with the output torque is, the more the cooling system configured to increase the supply amount of the thermal transfer medium to the partition wall cooling route, stepwise or continuously.

3. The drive device according to claim 2, wherein the cooling system is configured to:

adjust the supply amount of the thermal transfer medium to the partition wall cooling route to a first supply amount when the vehicle speed index is lower than the first threshold value and also the torque index is lower than a second threshold value; and adjust the supply amount of the thermal transfer medium to the partition wall cooling route to a second supply amount when the vehicle speed index is lower than the first threshold value and also the torque index is higher than the second threshold value, the second supply amount being greater than the first supply amount.

4. A drive device for a vehicle, the drive device comprising:

a motor;

a gear unit that is mechanically connected to the motor;

a power conversion unit that is electrically connected to the motor;

a casing that includes a first chamber and a second chamber separated from each other by a partition wall, at least one of the motor and the gear unit being housed in the first chamber, and the power conversion unit being housed in the second chamber; and a cooling system that circulates a thermal transfer medium to at least one of the first chamber and the second chamber, wherein the cooling system includes a partition wall cooling route that supplies the thermal transfer medium to the partition wall, and is configured such that a supply amount of the thermal transfer medium to the partition wall cooling route is greater in a state in which vehicle speed of the vehicle is low and output torque of the motor is high, as compared to a state in which the vehicle speed is high and the output torque is low wherein, when a torque index correlated with the output torque is higher than a second threshold value, the greater a vehicle speed index correlated with the vehicle speed is, the more the cooling system is configured to reduce the supply amount of the thermal transfer medium to the partition wall cooling route, stepwise or continuously, and wherein the cooling system is configured to:

adjust the supply amount of the thermal transfer medium to the partition wall cooling route to a second supply amount when the torque index is higher than the second threshold value and also the vehicle speed index is lower than a first threshold value, and adjust the supply amount of the thermal transfer medium to the partition wall cooling route to a third supply amount when the torque index is higher than the second threshold value and also the vehicle speed index is higher than the first threshold value, the third supply amount being smaller than the second supply amount.

5. A drive device for a vehicle, the drive device comprising:

a motor;

a gear unit that is mechanically connected to the motor;

a power conversion unit that is electrically connected to the motor;

a casing that includes a first chamber and a second chamber separated from each other by a partition wall, at least one of the motor and the gear unit being housed in the first chamber, and the power conversion unit being housed in the second chamber; and a cooling system that circulates a thermal transfer medium to at least one of the first chamber and the second chamber, wherein the cooling system includes a partition wall cooling route that supplies the thermal transfer medium to the partition wall, and is configured such that a supply amount of the thermal transfer medium to the partition wall cooling route is greater in a state in which vehicle speed of the vehicle is low and output torque of the motor is high, as compared to a state in which the vehicle speed is high and the output torque is low, wherein at least the motor is housed in the first chamber, and wherein the cooling system further includes a motor cooling route that supplies the thermal transfer medium to the motor, and is configured to switch, between at least two levels, a ratio of the supply amount of the thermal transfer medium supplied to the partition wall cooling route as to a supply amount of the thermal transfer medium supplied to the motor cooling route, in accordance with a combination of a vehicle speed index correlated with the vehicle speed and a torque index correlated with the output torque.

6. The drive device according to claim 5, wherein, when the torque index is higher than a second threshold value, the greater the vehicle speed index is, the more the cooling system is configured to reduce the ratio, stepwise or continuously.

7. The drive device according to claim 6, wherein the cooling system is configured to:

adjust the ratio to a first ratio when the torque index is higher than the second threshold value and also the vehicle speed index is lower than a first threshold value, and adjust the ratio to a second ratio that is smaller than the first ratio when the torque index is higher than the second threshold value and also the vehicle speed index is higher than the first threshold value.

8. The drive device according to claim 5, wherein:

the thermal transfer medium is a liquid; and the cooling system further includes a pump that supplies the thermal transfer medium to the partition wall cooling route and the motor cooling route, and a flow rate adjustment unit configured to adjust the ratio of the supply amount of the thermal transfer medium supplied to the partition wall cooling route as to the supply amount of the thermal transfer medium supplied to the motor cooling route.

9. The drive device according to claim 1, wherein:

the thermal transfer medium is oil;

the first chamber further includes a gear compartment that houses the gear unit; and the oil is stored in the first chamber.

10. The drive device according to claim 9, wherein:

the casing further includes a reservoir, for storing the oil, at a lower portion of the gear compartment;

a portion of the gear unit is immersed in the oil stored in the reservoir;

the cooling system further includes a pump that delivers the oil stored in the reservoir to the partition wall cooling route; and the cooling system is configured to switch a delivery amount from the pump between at least two levels in accordance with a combination of a vehicle speed index correlated with the vehicle speed and a torque index correlated with the output torque.

11. The drive device according to claim 10, wherein, the greater the vehicle speed index is, the more the cooling system is configured to reduce the delivery amount of the oil that is delivered to the partition wall cooling route, stepwise or continuously.

12. The drive device according to claim 11, wherein:

the first chamber further includes a motor compartment that houses the motor;

the cooling system further includes a motor cooling route that supplies the oil to the motor;

the pump delivers the oil stored in the reservoir to the partition wall cooling route and the motor cooling route; and the cooling system is configured to switch a ratio of a supply amount of the oil supplied to the partition wall cooling route as to a supply amount of the oil supplied to the motor cooling route between at least two levels in accordance with a combination of the vehicle speed index and the torque index.

13. The drive device according to claim 12, wherein, when the torque index is higher than a second threshold value, the greater the vehicle speed index is, the more the cooling system is configured to reduce the ratio stepwise or continuously.

14. The drive device according to claim 13, wherein the cooling system is configured to:

adjust the ratio to a first ratio when the vehicle speed index is lower than a first threshold value and also the torque index is higher than the second threshold value, and adjust the ratio to a second ratio that is smaller than the first ratio when the vehicle speed index is higher than the first threshold value and also the torque index is higher than the second threshold value.

15. The drive device according to claim 14, wherein the cooling system further includes a flow rate adjustment unit configured to adjust a ratio of the supply amount of the thermal transfer medium supplied to the partition wall cooling route as to a supply amount of the thermal transfer medium supplied to the motor cooling route.

16. The drive device according to claim 1, wherein the partition wall cooling route includes a flow route disposed within the partition wall.

* * * * *